United States Patent [19]

Sato

[11] Patent Number: 5,546,192
[45] Date of Patent: Aug. 13, 1996

[54] DEVICE FOR RECORDING AN IMAGE SIGNAL SO THAT THE RESULTING RECORDED SIGNAL HAS A SMALLER NUMBER OF HORIZONTAL SCANNING LINES IN A FIELD

[75] Inventor: Koichi Sato, Tokyo, Japan

[73] Assignee: Asahi Kogaku Kogyo Kabushiki Kaisha, Tokyo, Japan

[21] Appl. No.: 257,442

[22] Filed: Jun. 8, 1994

Related U.S. Application Data

[63] Continuation of Ser. No. 68,088, May 28, 1993, abandoned.

[30] Foreign Application Priority Data

Jun. 1, 1992 [JP] Japan ............................ 4-165310

[51] Int. Cl.⁶ .................... H04N 5/76; H04N 9/79
[52] U.S. Cl. ............................ 358/335; 358/310
[58] Field of Search ........................ 358/335, 310, 358/342; 360/9.1, 29, 32, 33.1; 348/458, 476, 477, 469, 432, 435, 443

[56] References Cited

U.S. PATENT DOCUMENTS 4,994,899  2/1991  Rhodes ............................ 358/11
5,038,219  8/1991  Yamashita et al. ............... 358/310
5,159,460  10/1992 Senso ............................... 358/310
5,223,944  6/1993  Shimada et al. ................. 358/330

FOREIGN PATENT DOCUMENTS 2177793  7/1990  Japan.
5-30461  2/1993  Japan.

OTHER PUBLICATIONS

English Language Abstract of JP-5-30461.
A Copy of pp. 205–208 of Japanese Publication entitled, "Broadcasting System", Along with an English Language Translation of pp. 205–208.

*Primary Examiner*—Howard W. Britton
*Assistant Examiner*—Robert Chevalier
*Attorney, Agent, or Firm*—Greenblum & Bernstein, P.L.C.

[57] ABSTRACT

An image signal recording device records image signals in a HDTV mode onto a magnetic disk in accordance with a predetermined mode, for example, an NTSC mode. The NTSC mode is provided with a vertical blanking period and horizontal scanning periods in which image signals are recorded. A part of the image signals are recorded in a part of the vertical blanking period, so that the number of scanning lines per one field is increased in comparison with a conventional device; thus, as much as possible of the HDTV mode image signals are recorded on the magnetic disk.

25 Claims, 10 Drawing Sheets

DEVICE FOR RECORDING AN IMAGE SIGNAL SO THAT THE RESULTING RECORDED SIGNAL HAS A SMALLER NUMBER OF HORIZONTAL SCANNING LINES IN A FIELD

This application is a continuation of application Ser. No. 08/068,088, filed May 28, 1993, now abandoned.

BACKGROUND OF THE INVENTION

1. Field of the Invention

The present invention relates to an image signal recording device by which an image signal generated in accordance with the HDTV (High Definition TV) mode and the like is recorded on a magnetic disk in accordance with a standard television mode and the like.

2. Description of the Related Art

Conventionally, a still video device is constructed in such a manner that an image signal generated in accordance with a standard television mode (the NTSC mode, for example) is recorded on a track of a magnetic disk in accordance with a still video format. The bandwidth of the image signal is limited, due to the construction of the disk device, and thus cannot be freely expanded. Accordingly, in a conventional still video device, when an image signal having a high quality, or broad bandwidth, is inputted to the still video device, the image resolution is limited, and thus, the quality of the image is lowered.

In Japanese Unexamined Patent Publication No. 5-30461, a still video device by which a high definition image recorded in the HDTV mode, for example, is recorded on a magnetic disk, is disclosed. In this still video device, an image signal corresponding to one image is divided into a plurality of parts, and is subsampled. Then, this subsampled image signal is time-expanded, and is recorded on a track of the magnetic disk. Namely, when an image signal corresponding to one image is divided into two parts, the image signal is recorded on four tracks in a frame mode.

The number of effective scanning lines provided in one image recorded in accordance with a high vision mode, which is one variation of the HDTV mode, is 1035. Therefore, when one image is divided and recorded on four tracks, the number of effective scanning lines recorded on one track is approximately 259. In the still video device, however, the number of effective scanning lines provided on one track of a magnetic disk is 241.5 in the NTSC mode, and therefore, all the image signal of the HDTV mode cannot be recorded on the magnetic disk.

SUMMARY OF THE INVENTION

Therefore, an object of the present invention is to provide an image signal recording device by which as much of an image signal as possible recorded in accordance with an image signal processing mode, such as the HDTV mode, in which the number of scanning lines in one image is large, can be recorded on a recording medium, such as a magnetic disk.

According to the present invention, there is provided an image signal recording device comprising reading means and recording means. The reading means reads an image signal which has been generated in accordance with a first mode in which the number of scanning lines in one field is set to a predetermined value. The recording means records the image signal on a recording medium in accordance with a second mode, in which the number of scanning lines in one field is smaller than that of the first mode and a vertical blanking period is provided. A part of the image signal is stored in a part of the vertical blanking period.

Further, according to the present invention, there is provided a device for processing, an image signal generated in accordance with a first mode, in which the number of scanning lines in one field is set to a predetermined value. The processing device comprises storing means, reading means and recording means. The storing means stores the image signal in a memory. The reading means reads the image signal from the memory. The recording means records the image signal read from the memory on a recording medium in accordance with a second mode, in which the number of scanning lines in one field is smaller than that of the first mode and a vertical blanking period is provided, in such a manner that a part of the image signal is stored in a part of the vertical blanking period.

Furthermore, according to the present invention, there is provided a device for processing an image signal generated in accordance with a first mode to generate an image signal in accordance with a second mode, the number of scanning lines in one field in the second mode being smaller than that in the first mode. The image signal processing device comprises storing means, reading means and control means. The storing means stores an image signal in accordance with the first mode. The reading means reads the image signal from the storing means. The control means controls the reading means in such a manner that a reading operation is started at a blanking period in which an image signal is not included in the second mode, to generate an image signal in accordance with the second mode.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
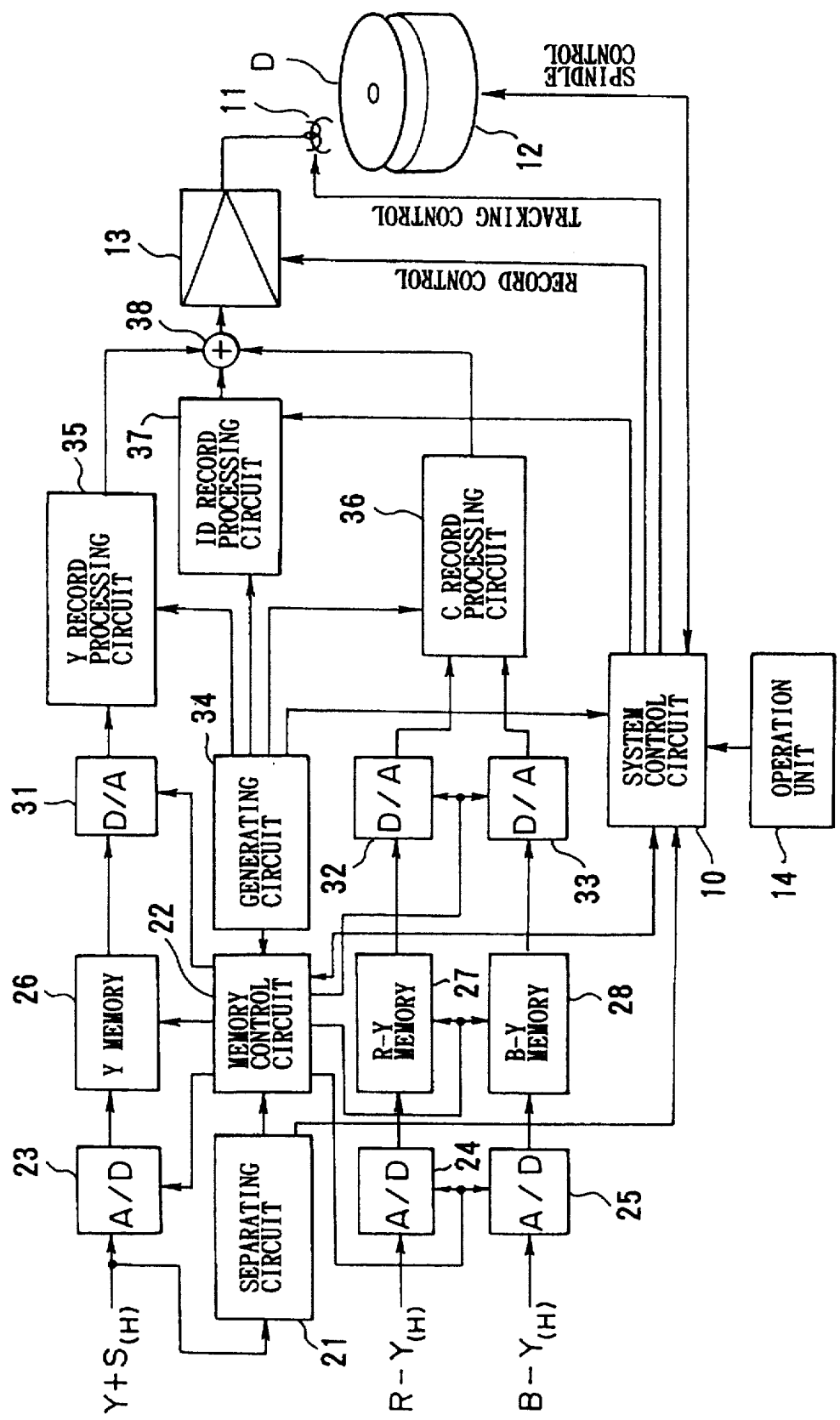
FIG. 1 is a block diagram showing a recording system of a still video device to which an embodiment of the present invention is applied.

The present invention will now be described with reference to embodiments shown in the drawings.

FIG. 1 is a block diagram showing a recording system of a still video device according to an embodiment of the present invention.

A system control circuit 10 comprises a microcomputer that controls the still video device, the still video device having a magnetic head 11 and a spindle motor 12 for rotating a magnetic disk D. The magnetic head 11 is controlled by the system control circuit 10 to be displaced along a radial direction of the magnetic disk D, and thus positioned at a predetermined track of the magnetic disk D. The spindle motor 12 is controlled by the system control circuit 10 to rotate the magnetic disk D at a rotation speed of 3600 rpm, for example. During the rotation of the magnetic disk D, the magnetic head 11 is positioned at a predetermined track of the magnetic disk D and records image signals and identification (ID) codes on this track. The recording amplifier 13 is controlled by the system control circuit 10 and outputs image signals, ID codes and other signals to the magnetic head 11. Note, the magnetic disk D has 52 tracks, and the image signals and the other signals are recorded on 50 tracks starting from the outermost track and continuing inward on the magnetic disk D.

An operation unit 14 is connected to the system control circuit 10, to operate the still video device. Note, a record mode, a photographing date, and so on, which are ID codes related to an image recorded on the magnetic disk D, are inputted through the operation unit 14. When the operation unit 14 is operated to select a record mode in which image signals of the HDTV mode are changed to image signals of the standard television mode to be recorded on a magnetic disk, information indicating that the image signals are recorded on a recording track of the magnetic disk according to the record mode is added to a user's area of the ID code.

High quality image signals obtained through a still video camera (not shown) or an input terminal (not shown) are inputted to the still video device as R-Y and B-Y differential color signals and a luminance signal (Y+S) including a synchronizing signal S. This synchronizing signal S is a composite synchronizing signal including a horizontal synchronizing signal, a vertical synchronizing signal and an equalizing synchronizing signal.

Note, in this case, the inputted image signals have been generated in accordance with the HDTV mode. Further note, in the drawing, the reference "H" added to the luminance signal and the differential color signals refers to high quality.

A synchronizing signal S included in the luminance signal (Y+S) is separated from the luminance signal (Y+S) by a synchronizing signal separating circuit 21, and transmitted to a memory control circuit 22 and the control circuit 10. The memory control circuit 22 controls A/D converters 23, 24, 25, a Y memory 26, an R-Y memory 27 and a B-Y memory 28, based on the synchronizing signal S. The memory control circuit 22 also controls D/A converters 31, 32, 33, the Y memory 26, the R-Y memory 27 and the B-Y memory 28, based on a synchronizing signal outputted from a synchronizing signal generating circuit 34, to be described later.

The luminance signal (Y+S) including the synchronizing signal is A/D converted by the A/D converter 23, and a luminance signal Y recorded between two horizontal synchronizing signals is stored in the Y memory 26. Similarly, the R-Y differential color signal is A/D converted by the A/D converter 24 and stored in the R-Y memory 27, and the B-Y differential color signal is A/D converted by the A/D converter 25 and stored in the B-Y memory 28.

The luminance signal Y stored in the Y memory 26, the R-Y differential color signal stored in the R-Y memory 27, and the B-Y differential color signal stored in the B-Y memory 28 are D/A converted by the D/A converters 31, 32 and 33, respectively, which are operated based on a synchronizing signal (a standard clock signal) outputted from the synchronizing signal generating circuit 34. Note, the period of the above-mentioned standard clock signal is half, for example, of that of a standard clock signal used for recording an image signal to the memories 26, 27 and 28. Accordingly, the image signals are read out from each of the memories 26, 27 and 28 at a relatively slow speed, whereby the image signals are time-expanded. The D/A converted luminance signal Y is inputted to the Y record processing circuit 35 and subjected to a process, such as an FM-modulation process. The D/A converted R-Y and B-Y differential color signals are inputted to a C record processing circuit 36 and subjected to a process, such as an FM-modulation process.

An ID code inputted through the operating unit 14 and the control circuit 10 is subjected to a process, such as differential phase shift keying (DPSK) modulation process, by an ID record processing circuit 37.

The DPSK-modulated ID code, the FM-modulated luminance signal and differential color signal are superimposed one on the other by an adder 38, and then amplified by the record amplifier 13 and transmitted to the magnetic head 11; the ID code, the luminance signal and the differential color signal are then recorded on a predetermined track of the magnetic disk D through the magnetic head 11. The signals recorded on the magnetic disk D have been time-expanded in comparison with signals inputted to the still video device, as described above.

In this embodiment, image signals inputted to the still video device are subsampled and stored in the memories 26, 27 and 28. Then, the image signals are read from the memories 26, 27 and 28 with time-expansion, and recorded on the magnetic disk D. This operation is described with reference to FIGS. 2 through 5. Note, in this embodiment, the inputted image signals are recorded on the magnetic disk D in the frame recording mode, and the number of scanning lines and the line frequency of the inputted image signal are determined according to the HDTV mode (the high vision mode) and so on.

Figure 2:
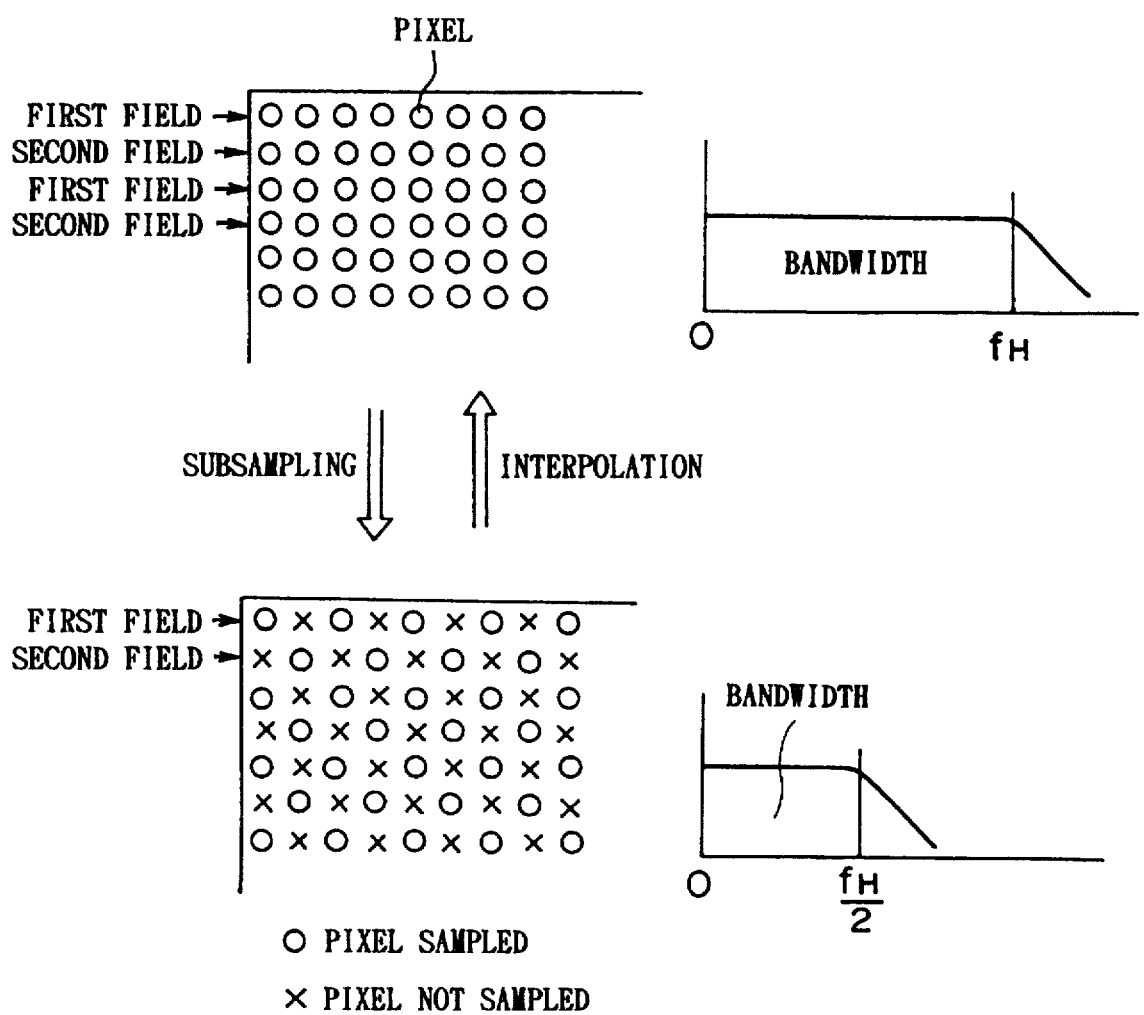
FIG. 2 is a diagram showing a relationship between subsampling and interpolation.

FIG. 2 shows a relationship between subsampling and interpolation. In this drawing, the bandwidth of the inputted image signals is $f_H$, and the image signals are stored in the memories 26, 27 and 28 after half of the pixels of the image signals have been subsampled. Further, when reproducing the image signals, the image signals are interpolated by a known method, so that the subsampled pixels substantially reappear, and thus, image signals having almost the same quality as the inputted image signals are obtained.

In FIG. 2, with regard to the pixels of the first field, the leftmost pixel of the frame is sampled and the pixel positioned next to the leftmost pixel is thinned out. The same operation is applied successively, such that the sampling is carried out at every other pixel. Conversely, regarding pixels of the second field, the leftmost pixel of the frame is thinned out and the pixel positioned next the leftmost pixel is sampled. Again, the same operation is applied successively, such that the sampling is carried out at every other pixel. Accordingly, pixels of the inputted image signals are subsampled uniformly over the frame.

Figure 3:
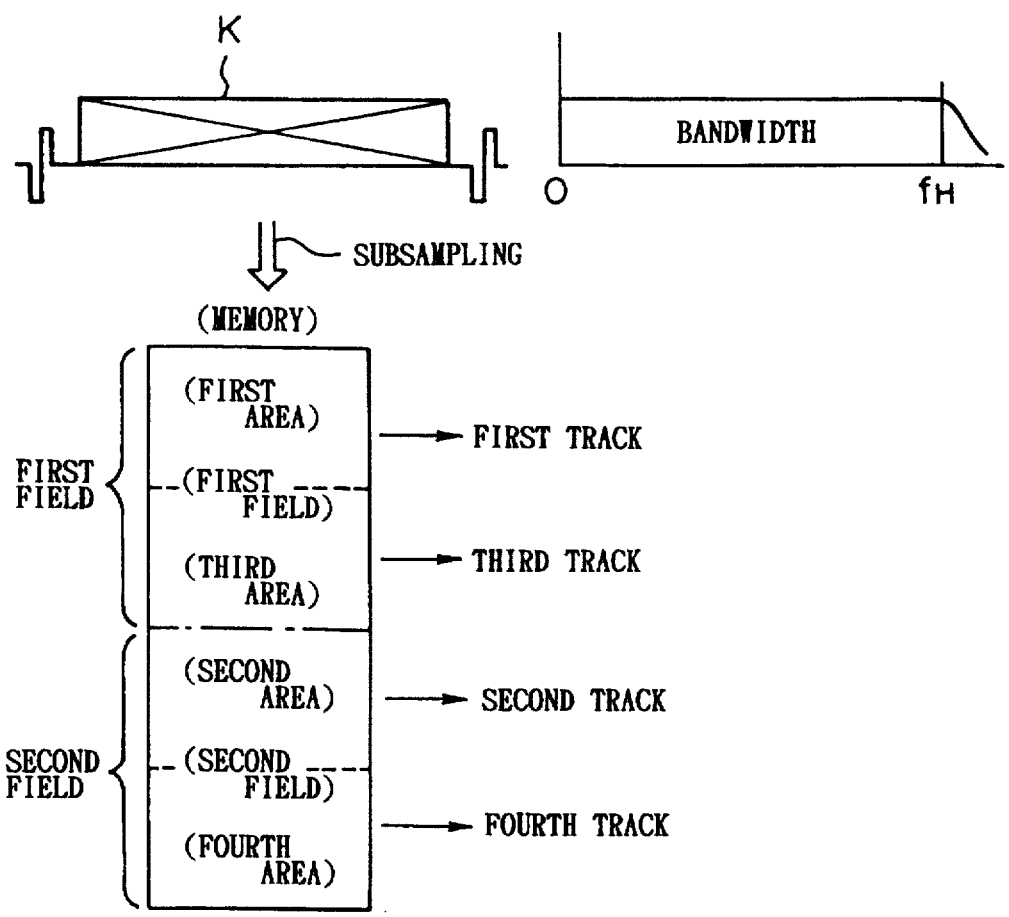
FIG. 3 is a diagram showing a relationship among inputted image signals, image signals recorded in memories, and image signals recorded on a magnetic disk.
Figure 3:
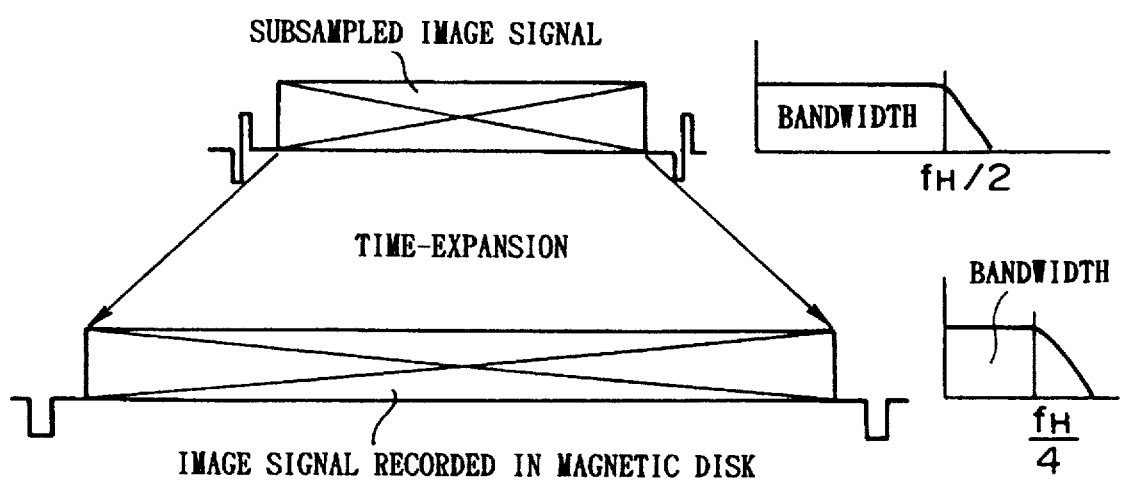

FIG. 3 shows a relationship among inputted image signals, image signals recorded in the memories, and image signals recorded on the magnetic disk D. The inputted image signal corresponds to one horizontal scanning line. In this drawings although the bandwidth of the inputted image signal K is $f_H$, image signals stored in the memories are subsampled, so that the bandwidth of the image signals becomes $f_H/2$. Image signals of a first field and image signals of a second field are divided and stored in a first recording area through a fourth recording area of the memories 26, 27 and 28, respectively. Namely, image signals corresponding to an upper frame of the first field are stored in the first recording area of the memories; image signals corresponding to a lower frame of the first field are stored in the third recording area of the memories; image signals corresponding to an upper frame of the second field are stored in the second recording area of the memories; and image signals corresponding to a lower frame of the second field are stored in the fourth recording area of the memories. The image signals stored in the first through fourth recording areas are recorded on the first through fourth tracks of the magnetic disk D.

The image signals stored in the memories are time-expanded two times when recorded on the magnetic disk D, whereby the bandwidth of the image signal becomes $f_H/4$. Therefore, even if the inputted image signals have been formed according to the HDTV mode, the image signals can be recorded on the magnetic disk D by the still video device while maintaining the high quality thereof.

Figure 4:
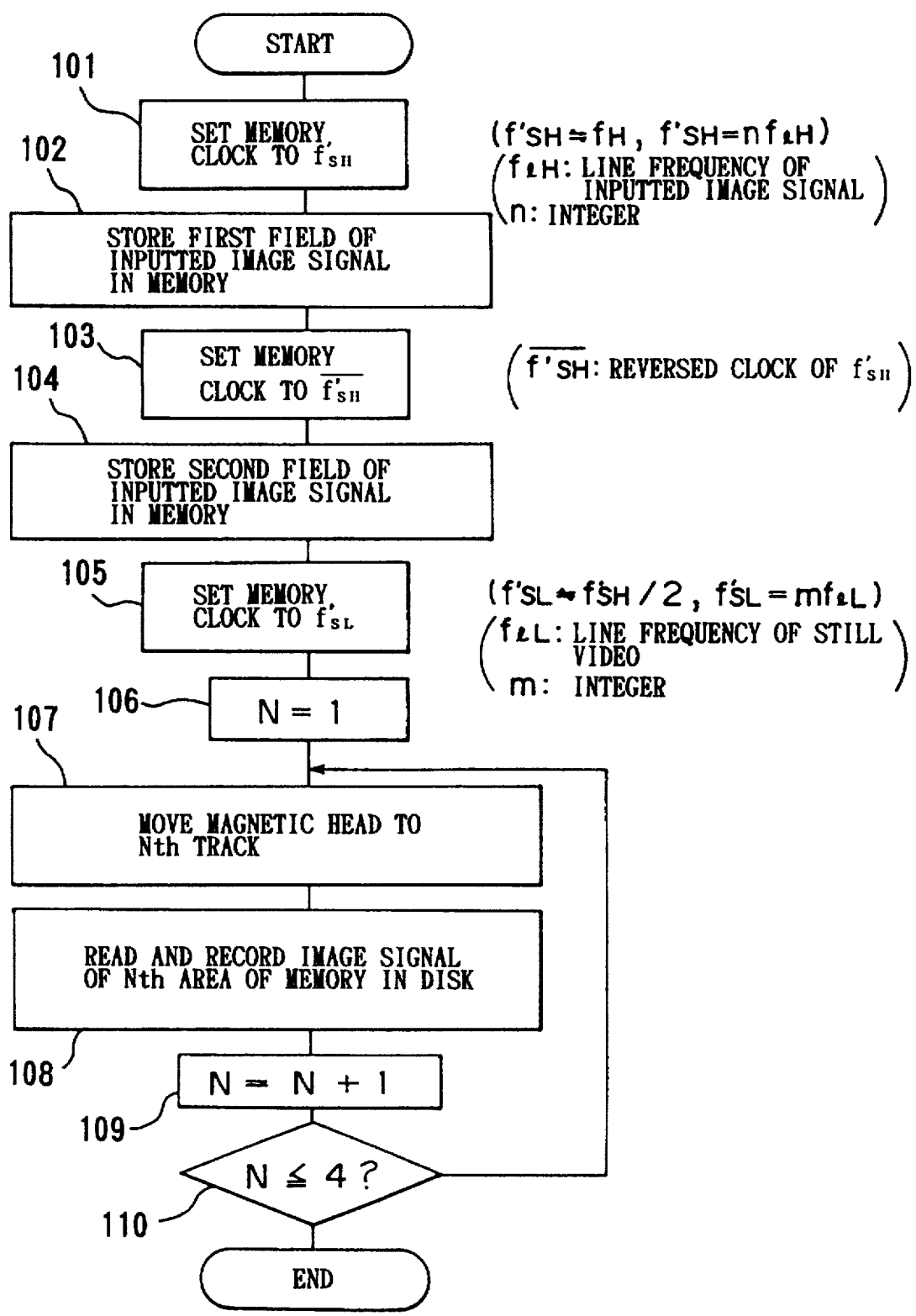
FIG. 4 is a flowchart of a program by which inputted image signals of one frame are divided into two parts and subsampled to be recorded on the magnetic disk.

FIG. 4 shows a flowchart of a program by which inputted image signals of one frame are divided into two parts and subsampled to be recorded on the magnetic disk Ds as shown in FIG. 3. This program is executed by the memory control circuit 22.

In Step 101, the frequency of a memory clock is set to $f_{SH}$, which is approximately equal to the bandwidth $f_H$ of the inputted image signals. This memory clock speed is equal to an integer times the horizontal line frequency of the inputted image signals, and is generated based on the standard clock signals outputted from the synchronizing signal generating circuit 34. The reason why the frequency of the memory clock is set to an integer times the horizontal line frequency of the inputted image signals is that the clock signal is raised at the left end of the frame. Accordingly, regarding the first field, odd numbered pixels counted from the left end of the frame are sampled, as described later.

Figure 5:
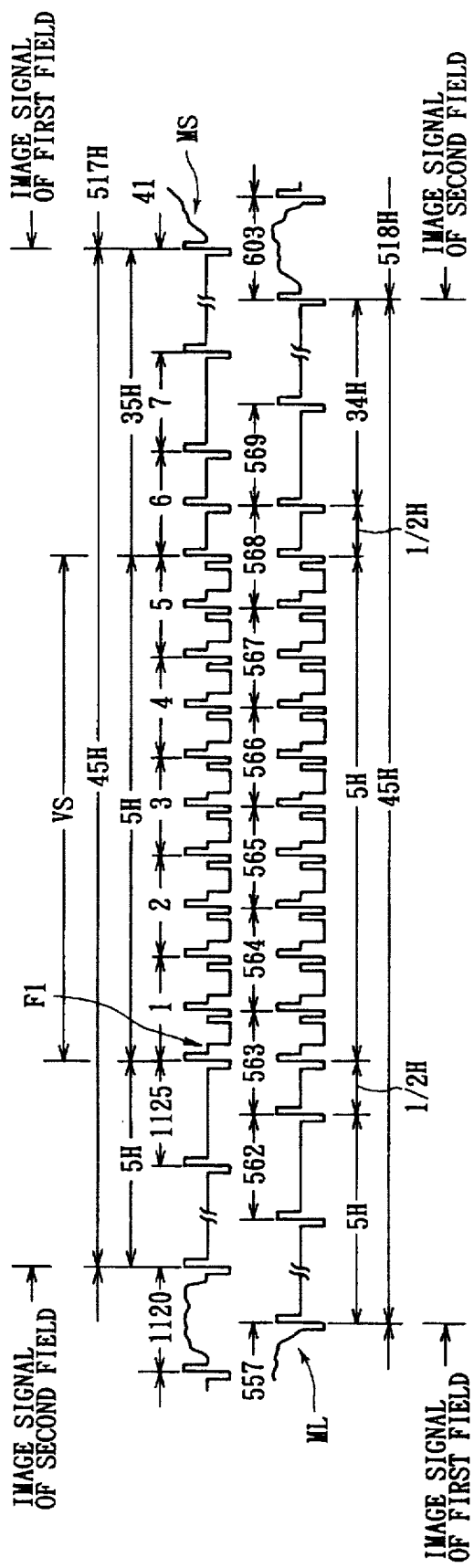
FIG. 5 is a diagram showing signal waveforms of a high vision mode.

In Step 102, the first field of inputted image signals is A/D converted based on the memory clock set in Step 101, and stored in the memories 26, 27 and 28. In this operation, all the image signals of the first field are stored in the memories 26, 27 and 28, as described below. Namely, as shown in FIG. 5 which shows signal waveforms of the high vision mode, a vertical synchronizing signal corresponds to pulse signals shown by the reference VS, and a signal his corresponding to the 41st horizontal scanning period counted from the first pulse signal F1 corresponds to the first scanning line (image signal) of the first field. In Step 102, the 41st signal his through the 557th signal ML are stored in the memories as the image signal. The memory control circuit 22 recognizes the timings of the signals F1, MS and ML shown in FIG. 5 in accordance with the kind of synchronizing signal outputted from the synchronizing signal separating circuit 21, and in accordance with the timings, the image signals are A/D converted, so that 517 scanning lines are stored in the memories 26, 27 and 28.

Then, in Step 103, the memory clock is inverted (phase reversed), so that the rising and falling edges of the memory clock are shifted by exactly 180° (or by a half period) in relation to the memory clock set in Step 101. Based on the memory clock set in Step 104, the second field of the inputted image signals is A/D converted to be stored in the memories 26, 27 and 28, similar to Step 102.

Figure 6:
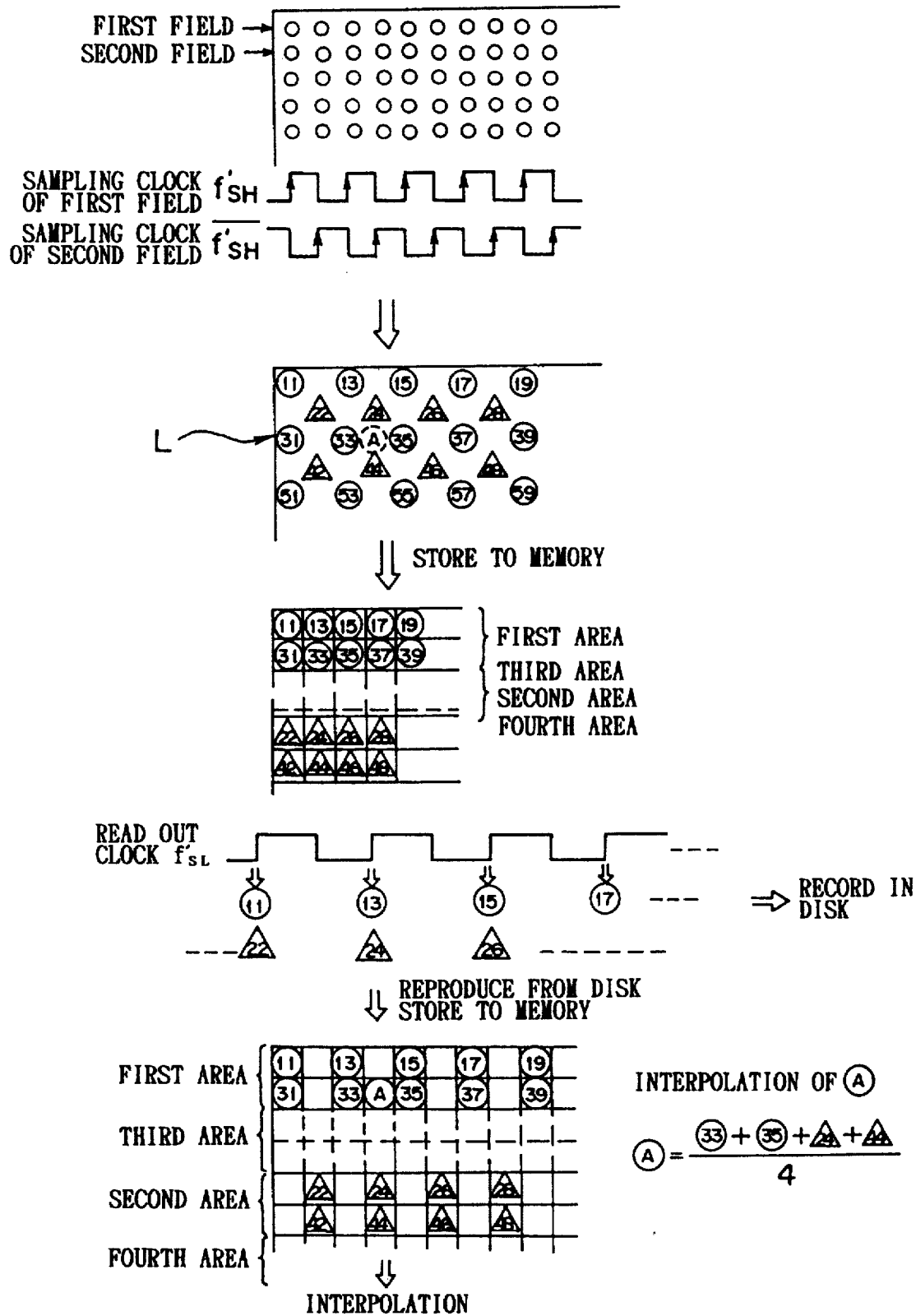
FIG. 6 is a diagram showing an operation in which image signals recorded in the magnetic disk by subsampling are read from the magnetic disk.

With reference to FIG. 6, an operation in which the image signals are stored in the memories in Steps 102 and 104 is described below.

A sampling of pixels of the image signals is carried out by raising the clock signal. Therefore, as shown by reference L, in the first field, the odd numbered pixels counted from the left end of the drawing are sampled, and in the second field the even numbered pixels counted from the left end of the drawing are sampled. The pixels of the first field sampled by this operation are stored in the first and third recording areas of the memories, and the pixels of the second field sampled by this operation are stored in the second and fourth recording areas.

In Step 105, the memory clock is set to the frequency $f_{SL}$. This frequency $f_{SL}$ is half of the frequency $f_{SH}$, which is provided for storing the inputted image signals into the memories, and is an integer times the line frequency of the still video. The reason why the frequency of the memory clock is set to an integer times the line frequency of the still video is so that, on the magnetic disk, the relative positions of the synchronizing signal and the image signal are exactly aligned with each other.

In Step 106 a counter N is set to "1", in Step 107 the magnetic head 11 is moved to the Nth track, and in Step 108 the image signals stored in the Nth recording areas of the memories 26, 27 and 28 are read out with a timing of the frequency $f_{SL}$, and recorded on the magnetic disk D. In this operation, the synchronizing signal generating circuit 34 outputs a vertical synchronizing signal, and at the timing of 10H (H indicates the horizontal scanning period) counted from the beginning of the vertical blanking period (see FIG. 7), the 41st signal MS (see FIG. 5) is recorded on the magnetic disk D. Sequentially, the signals up to the 294th signal are recorded on the magnetic disk D, as described later. Namely, 254 scanning lines are recorded on the magnetic disk D.

Thus, the memory control circuit 22 starts to read the image signals from the memories 26, 27 and 28, at the timing at which a conventional device does not start to read the image signals from the memories, so that more image signals than those recorded by the conventional device are recorded on the magnetic disk D. Namely, the memory control circuit 22 starts to read the image signals from the memories and D/A convert the image signals, at the timing of 10H or 272H counted from the beginning of the vertical blanking period.

In Step 109, the counter N is incremented by "1", and in Step 110 it is determined whether the counter N is less than or equal to "4". When the counter is less than or equal to "4", since the reading out of all of the image signals stored in all of the recording areas of the memories 26, 27 and 28 has not been completed, the process after Step 107 is again executed. Conversely, when the counter N is higher than "4", the image signals stored in all of the recording areas of the memories 26, 27 and 28 have been read out, and therefore, the program is ended.

Thus, in the loop from Steps 107 through 110, when the counter N is "2", the image signals which correspond to 603H through 856H and the upper part of the second field of the high vision mode are recorded on the second track of the magnetic disk. When the counter N is "3", the image signals which correspond to 295H through 547H and the lower part of the first field are recorded on the third track of the magnetic disk. When the counter N is "4", the image signals which correspond to 857H through 1110H and the lower part of the second field are recorded on the fourth track of the magnetic disk.

As described above, although all the image signals (517 scanning lines) of each field are stored in the memories 26, 27 and 28 in Steps 102 and 104, the number of scanning lines per one field recorded on the magnetic disk D in Step 108 is 507. This numbers however, is larger than that in a conventional device. This increase in the number of scanning lines in comparison with the conventional device is described below with reference to FIGS. 7 and 8.

These drawings show an example in which one frame recorded in accordance with the high vision mode is divided into two parts, i.e., an upper part and a lower parts and then recorded on the magnetic disk D in accordance with the NTSC mode.

Figure 7:
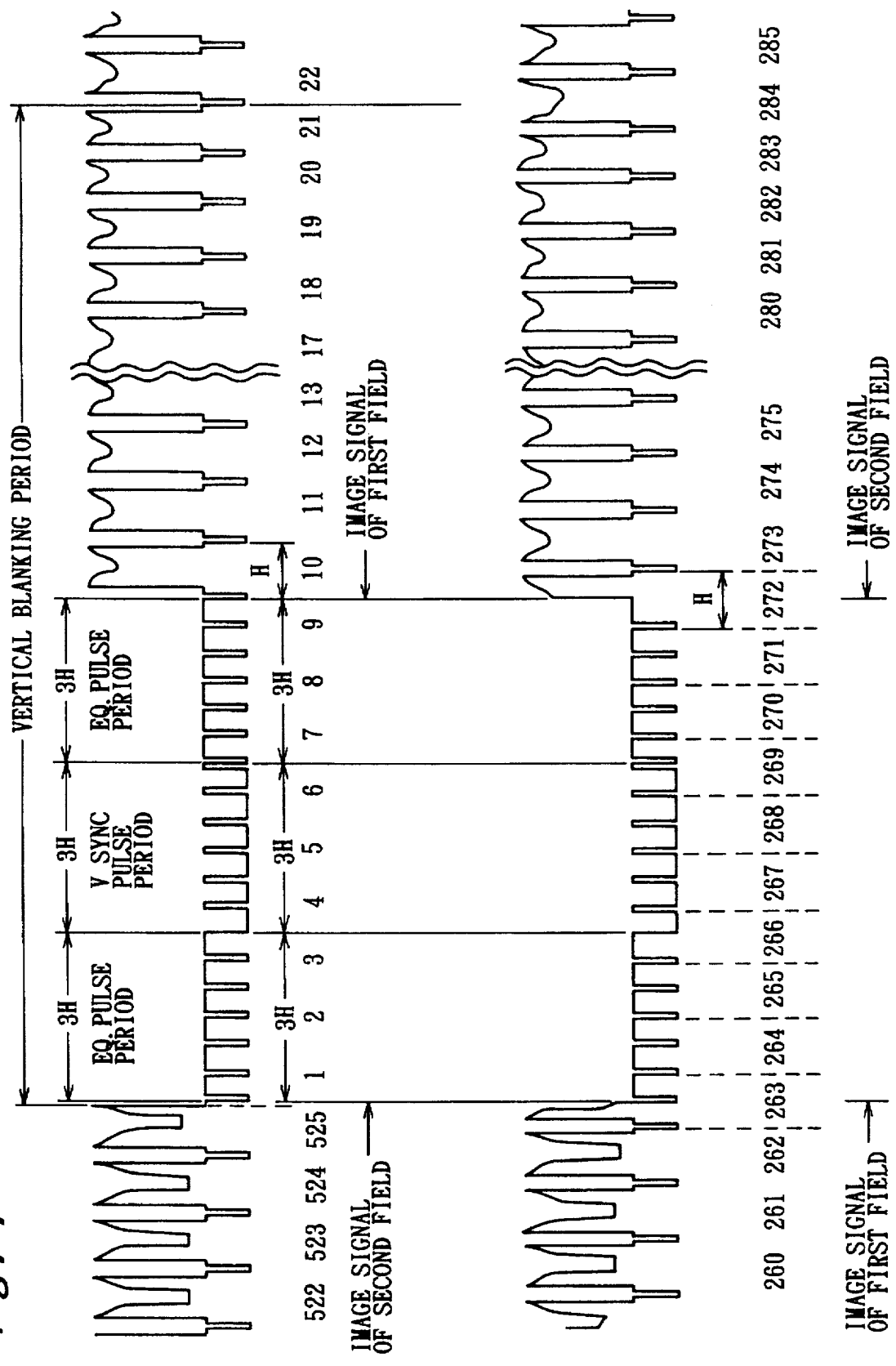
FIG. 7 is a diagram showing signals which are recorded on the magnetic disk.

FIG. 7 shows signals which are recorded on the magnetic disk D and correspond to the upper part of one frame. As shown in this drawing, the image of the first field is recorded from 10H through 263H, and the image of the second field is recorded from 272H through 525H. Parts corresponding to 1H through 21H and 263H through 284H are vertical blanking periods. Further, parts corresponding to 10H through 21H and 272H through 284H are horizontal scanning periods which can be used for transmitting character information in a multiplex character broadcasting mode (a mode in which character information is transmitted by using a frequency not used for transmitting image signals). In this embodiment, parts corresponding to 10H through 21H and 272H through 284 in the NTSC mode are used for recording image signals.

Figure 8:
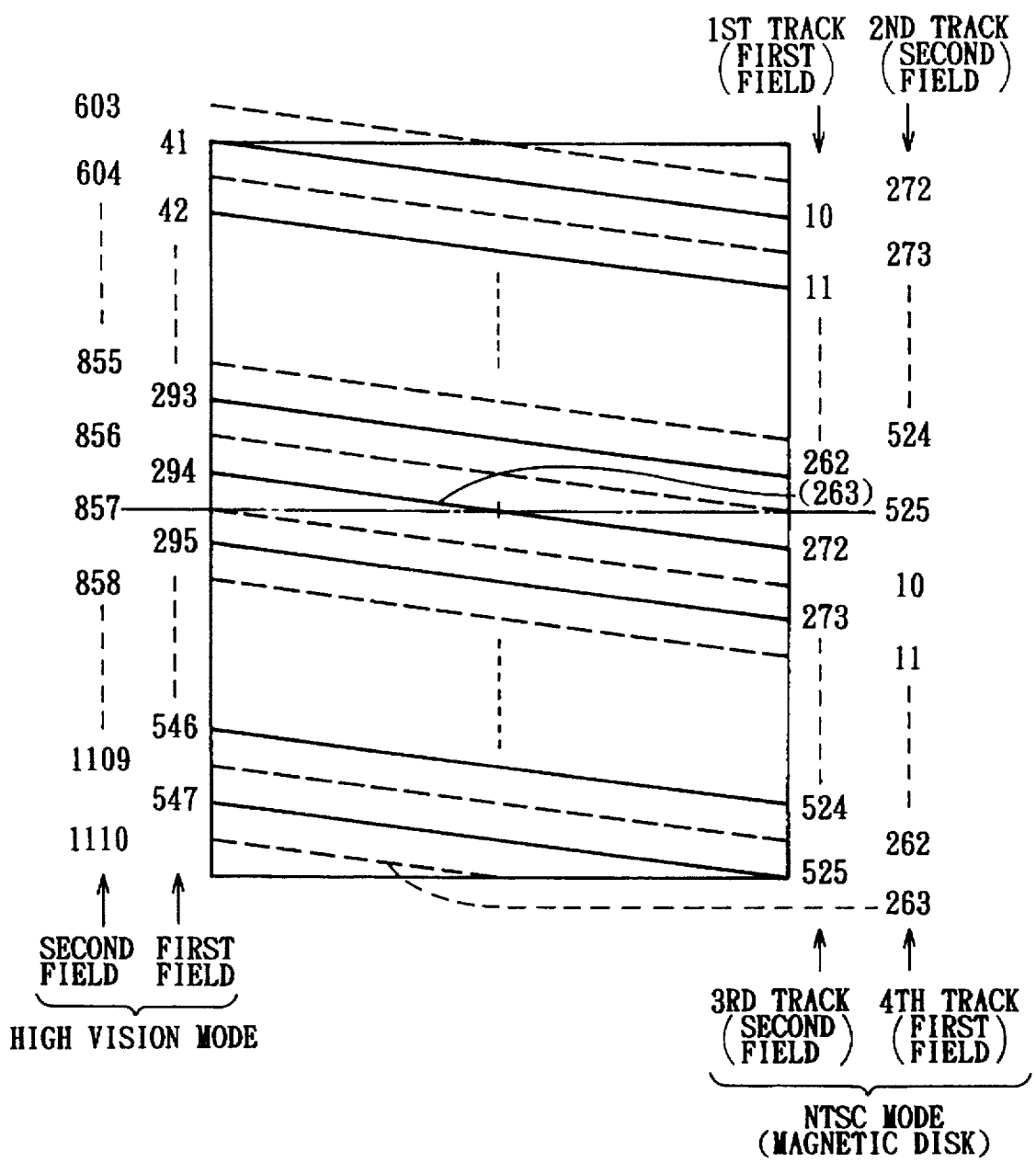
FIG. 8 is a diagram showing a relationship between horizontal scanning lines recorded on the magnetic disk and horizontal scanning lines in the high vision mode.

The relationship between each scanning line and the frame is described below with reference to FIG. 8.

In the high vision mode, as described above with reference to FIG. 5, regarding the first field, image signals corresponding to 41H through 557H are stored in the memories. Among the image signals stored in the memories, the image signals corresponding to 41H through 547H are recorded on the magnetic disk D. Similarly, regarding the second field, image signals corresponding to 603H through 1120H are stored in the memories, and the image signals corresponding to 603H through 1110H are recorded on the magnetic disk D.

Regarding the upper part of one frame, image signals of the first field of the high vision mode are recorded on a part corresponding to 10H through 263H on the magnetic disk D in accordance with the NTSC mode, and image signals of the second field of the high vision mode are recorded on a part corresponding to 272H through 525H on the magnetic disk D in accordance with the NTSC mode. The image signals of the first field of the high vision mode are recorded on a first track, and the image signals of the second field are recorded on a second track.

Regarding the lower part of one frame, image signals of the first field of the high vision mode are recorded on a part corresponding to 272H through 525H on the magnetic disk D in accordance with the NTSC mode, and image signals of the second field of the high vision mode are recorded on a part corresponding to 10H through 263H on the magnetic disk D in accordance with the NTSC mode. The image signals of the first field of the high vision mode are recorded on a third track, and the image signals of the second field are recorded on a fourth track.

The scanning lines 10H through 263H of the first field and the scanning lines 272H through 525H of the second field in the NTSC mode correspond to the scanning lines 41H through 547H of the first field of the high vision mode. The scanning lines 272H through 525H of the second field and the scanning lines 10H through 263H of the first field in the NTSC mode correspond to the scanning lines 603H through 1110H of the second field of the high vision mode.

Since, in this embodiment, the vertical blanking period is used for recording image signals from 10H through 21H in the first field and 272H through 284H in the second field, as shown in FIG. 7, the number of scanning lines recorded on the magnetic disk D is increased by 24 for one field in comparison with a conventional device, in which the vertical blanking period is not used for recording the image signals.

When image signals of the high vision mode are recorded on the magnetic disk D in accordance with the NTSC mode, 34 scanning lines per one field are omitted and not recorded in the conventional device. Conversely, in the embodiment, as described above, the number of scanning lines recorded on the magnetic disk D is increased by 24 in comparison with the conventional device. Therefore, when image signals generated in accordance with the high vision mode are reproduced by a still video device, the omitted part of the frame is largely decreased in comparison with the conventional device.

Figure 9:
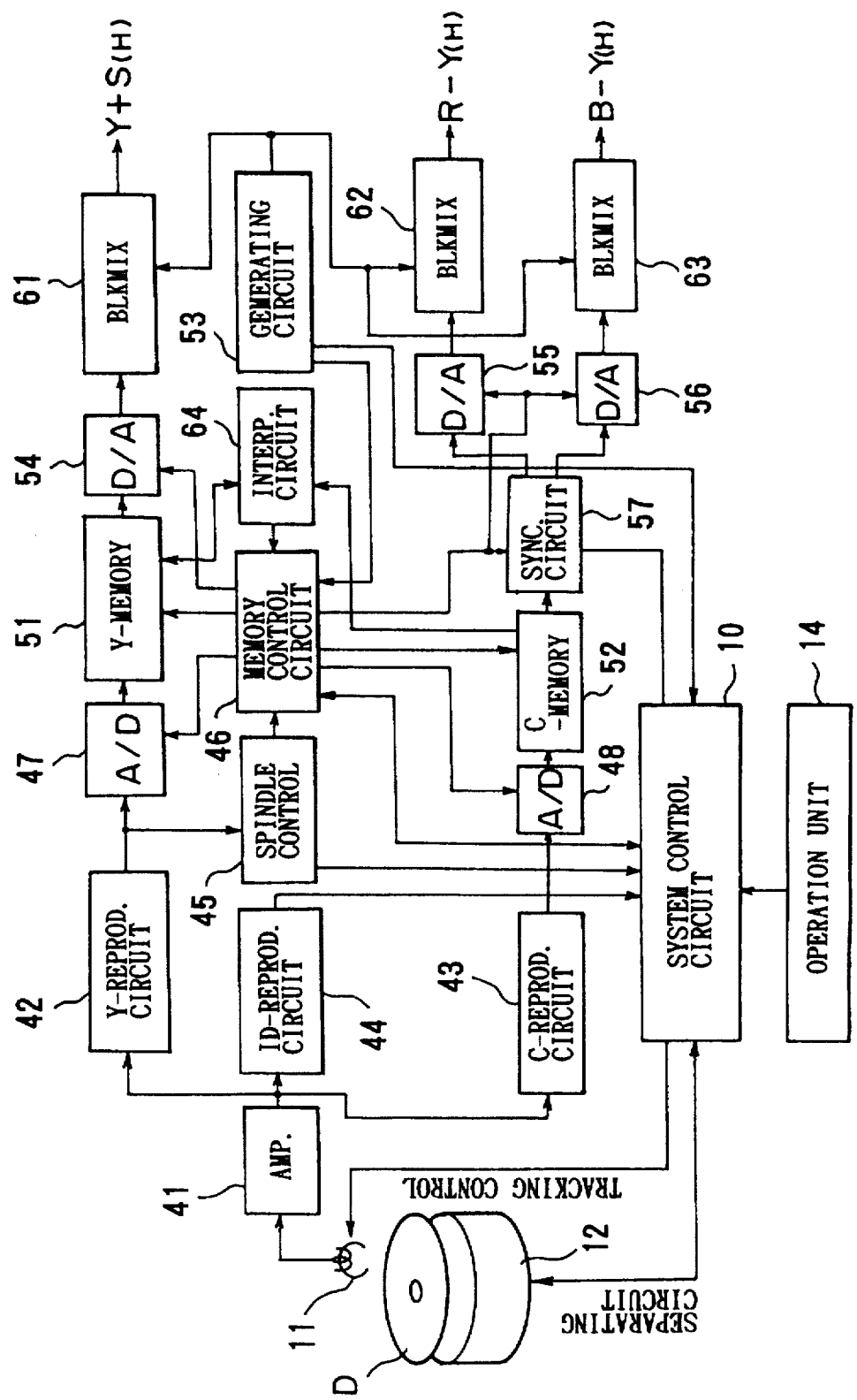
FIG. 9 is a block diagram showing a reproducing system of the still video device.

FIG. 9 shows a block diagram of a reproducing system of the still video device.

The system control circuit 10, the magnetic head 11, the spindle motor 12 and the operation unit 14 are also included in the recording system shown in FIG. 1; i.e., are provided for the recording system and the reproducing system.

The magnetic head 11 is positioned at a predetermined track of the magnetic disk D, so that TD codes and image signals recorded in the track are reproduced. A reproducing amplifier 41 reads the image signals and the TD codes recorded on the magnetic disk D, and outputs the same to a Y-reproduction process circuit 42, a C-reproduction process circuit 43, and an ID-reproduction process circuit 44. The Y-reproduction process circuit 42 frequency-demodulates the image signals and outputs luminance signals (Y+S) including synchronizing signals. The C-reproduction process circuit 43 frequency-demodulates the image signals and outputs an R-Y and a B-Y differential color signal. The ID-reproduction process circuit 44 DPSK-demodulates the image signals and outputs the ID codes.

A synchronizing signal S included in the luminance signal (Y+S) is separated from the luminance signal (Y+S) by a synchronizing signal separating circuit 45, and transmitted to a memory control circuit 46 and the system control circuit 10. The memory control circuit 46 controls A/D converters 47, 48, a Y-memory 51 and a C-memory 52, based on the synchronizing signal S. Further, the memory control circuit 46 controls D/A converters 54, 55, 56, the Y-memory 51 and the C-memory 52, based on a synchronizing signal outputted from a synchronizing signal generating circuit 53 to be described later.

The luminance signals (Y+S) including the synchronizing signals are A/D converted by the A/D converter 47, and the luminance signal Y recorded between two horizontal synchronizing signals is stored in the Y-memory 51 under the control of the memory control circuit 46. The luminance signal Y stored in the Y-memory 51 is D/A converted by the D/A converter 542 based on a synchronizing signal (a high standard clock signal according to the HDTV mode) outputted from the synchronizing signal generating circuit 53.

Similarly, the R-Y and the B-Y differential color signals are A/D converted by the A/D converter 48, and stored in the C-memory 52. The R-Y and the B-Y differential color signals are alternately outputted from the C-memory 522 based on the high standard clock signal, and the R-Y and the B-Y differential color signal formed on the same horizontal scanning line as each other are simultaneously outputted from a synchronization circuit 57, by an operation of the memory control circuit 46. The signals outputted from the synchronization circuit 57 are inputted to D/A converters 55 and 56 and are D/A converted.

The standard clock signal used for reading image signals from the Y-memory 51 and the C-memory 52 has a frequency value which is twice, for example, that of the standard clock signal used for recording image signals to the Y-memory 51 and the C-memory 52. Therefore, the image signals are read from the memories 51 and 52 at a relatively high speed, so that the image signals are time-compressed.

Blanking sync mix circuits 61, 62 and 63 are provided for setting a predetermined portion in front of the R-Y and the B-Y differential color signal to a zero level, and superimposing a synchronizing signal on that portion. Accordingly, by an operation of the blanking sync mix circuits 61, 62 and 63, a clear synchronizing signal which conforms with a system such as the HDTV mode is supplemented to a portion in front of these differential color signals. Each of the signals (Y+S), (R-Y) and (B-Y) outputted from the blanking sync mix circuits 61, 62 and 63 are inputted to a display device, not shown.

An interpolation process circuit 64 is provided for carrying out an interpolation based on a luminance and color-difference of pixels positioned around a pixel which are to reappear, to obtain a luminance and a color-difference of the reappearing pixel.

This interpolation is described below with reference to FIG. 6. Pixels obtained by this interpolation correspond to pixels which have been thinned out when the image signals are sampled. In the image signals shown by reference L, an interpolated pixel is shown by reference A encircled by a broken line. The value of the pixel (A) is obtained by taking the arithmetic mean of pixels positioned around the pixel A, shown by references 33, 35, 24 and 44. The pixels (33, 35) positioned at the left and the right sides of the pixel (A) belong to the same horizontal scanning line, and the pixels (24, 44) positioned above and below the pixel (A) belong to horizontal scanning lines positioned above and below the horizontal scanning line of the pixel (A), respectively. Namely, the pixels (24, 44) are included in a field that is different from a field in which the pixels (33, 35) are included.

Thus, since the thinned out pixels are approximated by interpolation, when the image signals recorded on the magnetic disk are reproduced, the image obtained has substantially the same resolution as the inputted image signals.

The ID code stored on the magnetic disk D is subjected to a process, such as a DPSK-demodulation process, in the ID-reproduction process circuit 44, so that the ID code is decoded by the system control circuit 10.

Figure 10:
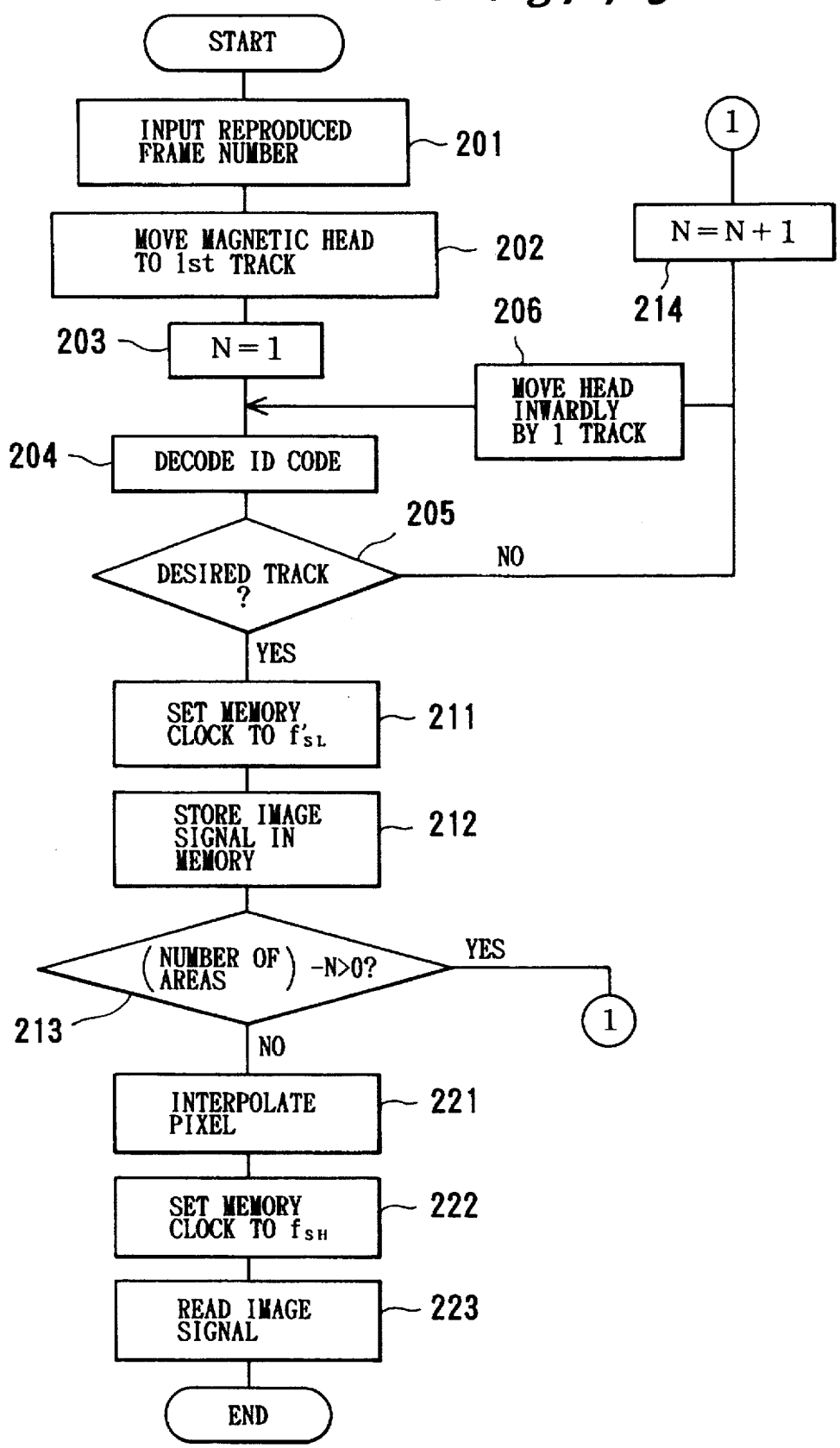
FIG. 10 is a flowchart of a program by which image signals recorded on the magnetic disk are reproduced.

FIG. 10 shows a flowchart of a program by which a magnetic disk D, on which image signals are divided with respect to a frame and recorded with time-expansion, is reproduced.

In Step 201, the reproducing frame number, i.e., the number of the frame to be reproduced, is inputted from the operation unit 14. In Step 202, the magnetic head 11 is moved to and positioned at the First track, i.e., the outermost track of the magnetic disk D, and in Step 203 the counter N is set to "1".

In Step 204, the ID codes of the first track are decoded, and in Step 205, based on the contents of the ID codes, it is determined whether the track corresponds to the desired image selected in Step 201. When this track does not correspond to the desired image, the magnetic head 11 is moved inwardly by one track in Step 206. Then, Steps 204 and 205 are repeatedly carried out until the desired track is found.

When the track storing the desired image is found, the process goes from Step 205 to Step 211, in which the memory clock is set to frequency $f_{SL}$. Frequency $f_{SL}$ is half of the bandwidth $f_H$ of the image signal (FIG. 4). In Step 212, based on the memory clock of the frequency $f_{SL}$, the image signals are A/D converted, and stored in predetermined recording areas of the Y-memory 51 and the C-memory 52.

In this operation, by decoding the ID code, the system control circuit 10 recognizes that some image signals are recorded in a portion corresponding to the vertical blanking period of the standard television mode, and informs the memory control circuit 46 that the image signals are recorded in the vertical blanking period portion. Due to this information of the system control circuit 10, the memory control circuit 46 controls the A/D converters 47 and 48 and the memories 51 and 52 in such a manner that A/D conversion of the A/D converters 47 and 48 and writing operation to the memories 51 and 52 are started earlier than those of usual reproduction, and thus, the image signals recorded in the vertical blanking period portion are stored in the memories 51 and 52.

In Step 212, image signals stored in the first and third recording areas are stored in an odd number row of the memories 51 and 52, and image signals stored in the second and fourth recording areas are stored in an even number row of the memories 51 and 52. As a result, the image signals in the memories 51 and 52 are stored, as shogun in the bottom part of FIG. 5, in such a manner that pixels belonging to the first and third recording areas are stored in an odd number row counted from the left end of the frame, and the pixels belonging to the second and fourth recording areas are stored in an even number row counted from the left end of the frame.

In Step 213, it is determined whether the difference between the number of the recording areas of the memory (four in this embodiment; see FIG. 3) and the counter N is larger than "0". When the number of the recording areas is larger than the counter N, since all the image signals have not been stored in the memories 51 and 52 yet, a process by which the next image signal is read from the magnetic disk D is carried out. Namely, in Step 214, the counter N is incremented by "1", and then, Steps 206, 204, 205, 211 and 212 are again carried out, so that the next image signal is stored in the memories 51 and 52, similar to the operation described above.

When it is determined in Step 213 that the number of recording areas is less than or equal to the counter N, since the image signals of one frame have been completely stored in the memories 51 and 52, the processes following Step 221 are carried out, and thus, the image is indicated by the display device. First, in Step 221, pixels thinned out from the memories are interpolated by pixels positioned around the thinned out pixel (see FIG. 6). In Step 222, the memory clock is set to the frequency $f_{SH}$. This frequency $f_{SH}$ is twice the frequency $f_{SH}$ with which the inputted image signals are subsampled, i.e., $f_{SH}=2f'_{SH}$. Then in Step 223, the image signals stored in the memories 51 and 52 are sequentially read and outputted to the display device.

As described above, according to the still video device of the above embodiments, image signals having a higher quality can be recorded in a recording medium, and can be reproduced from the recording medium, in comparison with a conventional still video device. Further, when image signals recorded on a magnetic disk by a conventional still video device are reproduced by the above embodiment still video device, a pluarlity of images are outputted on one frame, i.e., a multi-image indication can be obtained.

Note, although image signals are recorded in the frame recording mode in the above embodiment, the present invention can be applied to a field recording mode in which one frame is composed of one field.

Further, the present invention can be applied to a still video device in which image signals recorded in the PAL mode are recorded on a magnetic disk in the NTSC mode. In this case, it is not necessary for one frame to be divided into two parts and recorded on two tracks. Namely, image signals of one field are recorded on one track. Still further, the present invention can be applied to a still video device in which image signals recorded in the NTSC mode are recorded on a magnetic disk in the PAL mode.

Although the embodiments of the present invention have been described herein with reference to the accompanying drawings, obviously many modifications and changes may be made by those skilled in this art without departing from the scope of the invention.

The present disclosure relates to subject matter contained in japanese Patent Application No.4-165310 (filed on Jun. 1, 1992) which is expressly incorporated herein by reference in its entirety.

I claim:

1. A device for processing an image signal, said device comprising:

means for reading a first mode image signal, which comprises said image signal processed in accordance with a first mode to have K horizontal scanning lines per field; and means for recording a second mode image signal onto a recording medium, said second mode image signal being formed by processing said first mode image signal to have L horizontal scanning lines per field, L being smaller than K, an integer M being equal to the integer component of K÷L, a number N being the remainder of K÷L, said recording means comprising means for recording a part of N of said K horizontal scanning lines of said first mode image signal in a part of a vertical blanking period of said second mode image signal, whereby the number of horizontal scanning lines recorded on said recording medium is increased in comparison with a device in which said vertical blanking period is not used for recording said second mode image signal.

2. A device according to claim 1, wherein said first mode image signal comprises an HDTV signal, and further wherein said second mode image signal comprises an NTSC signal.

3. A device according to claim 2, wherein a number of horizontal scanning lines recorded in said vertical blanking period of said second mode image signal is up to 24.

4. A device according to claim 1, wherein said recording means comprises means for time-expanding said first mode image signal to record said second mode image signal on said recording medium.

5. A device according to claim 1, wherein said recording means comprises means for recording a part of said K horizontal scanning lines of said first mode image signal in a part of said vertical blanking period which can be used for transmitting character information in multiplex character broadcasting.

6. A device according to claim 1, further comprising a memory for storing said K horizontal scanning lines of said first mode image signal, so that said K horizontal scanning lines are available for processing and recording by said recording means.

7. A device according to claim 6, further comprising means for dividing one field of said first mode image signal into M parts, said device further comprising means for storing the divided parts of said first mode image signal into different areas of said memory.

8. A device according to claim 7, wherein said recording means comprises means for recording the divided parts of said first mode image signal in different recording areas of said recording medium.

9. A device according to claim 1, wherein said recording means comprises means for recording an ID code in said recording medium, said ID code indicating that said second mode image signal is recorded in said recording medium.

10. A device according to claim 9, further comprising means for decoding said ID code to recognize that said second mode image signal is recorded on said recording medium, and means for reproducing said second mode image signal in accordance with said ID code, whereby a number of horizontal scanning lines outputted on a display device is increased in comparison with a reproducing device in which said vertical blanking period is not used for recording said second mode image signal.

11. A device according to claim 1, wherein said second mode image signal is recorded on said recording medium in accordance with a still video format.

12. A method for processing an image signal, said method comprising:

reading a first mode image signal which comprises said image signal processed in accordance with a first mode to have K horizontal scanning lines per field; and recording a second mode image signal onto a recording medium formed by processing said first mode image signal to have L horizontal scanning lines per field, L being smaller than K, an integer M being equal to the integer component of K÷L, a number N being the remainder of K÷L, said recording comprising recording a part of N of said K horizontal scanning lines of said first mode image signal in a part of a vertical blanking period of said second mode image signal, whereby the number of horizontal scanning lines recorded on said recording medium is increased in comparison with a device in which said vertical blanking period is not used for recording said second mode image signal.

13. A method according to claim 12, wherein said first mode image signal comprises an HDTV signal, and further wherein said second mode image signal comprises an NTSC signal.

14. A method according to claim 13, wherein a number of horizontal scanning lines recorded in said vertical blanking period of said mode image signal is up to 24.

15. A method according to claim 12, wherein said recording comprises time-expanding said first mode image signal to record said second mode image signal on said recording medium.

16. A method according to claim 12, wherein said recording comprises recording a part of said K horizontal scanning lines of said first mode image signal in a part of said vertical blanking period which can be used for transmitting character information in multiplex character broadcasting.

17. A method according to claim 12, further comprising storing said K horizontal scanning lines of said first mode image signal in a memory, so that said K horizontal scanning lines are available for processing and recording during said recording.

18. A method according to claim 17, further comprising dividing one field of said first mode image signal into M parts, said device further comprising storing the divided parts of said first mode image signal into different areas of said memory.

19. A method according to claim 18, wherein said recording comprises recording the divided parts of said first mode image signal in different recording areas of said recording medium.

20. A method according to claim 12, wherein said recording comprises recording an ID code in said recording medium, said ID code indicating that said second mode image signal is recorded in said recording medium.

21. A method according to claim 20, further comprising decoding said ID code to recognize that said second mode image signal is recorded on said recording medium, and reproducing said second mode image signal in accordance with said ID code, whereby a number of horizontal scanning lines outputted on a display device is increased in comparison with a reproducing device in which said vertical blanking period is not used for recording said second mode image signal.

22. A method according to claim 12, wherein said second mode image signal is recorded on said recording medium in accordance with a still video format.

23. A device for recording an image signal onto a recording medium, said device comprising:

means for reading a first mode image signal, which comprises said image signal processed in accordance with a first mode to have R-Y and B-Y differential color signals, a luminance signal Y combined with a synchronizing signal S, and K horizontal scanning lines per field; and means for recording a second mode image signal formed by processing said first mode image signal to have R-Y and B-Y differential color signals, a luminance signal Y combined with a synchronizing signal S, and L horizontal scanning lines per field, L being smaller than K, said recording means comprising means for recording a part of said K horizontal scanning lines of said first mode image signal in a part of a vertical blanking period of said second mode image signal, whereby the number of horizontal scanning lines recorded on said recording medium is increased in comparison with a device in which said vertical blanking period is not used for recording said second mode image signal; and whereby each of said K horizontal scanning lines recorded in said part of a vertical blanking period comprises R-Y and B-Y differential color signals, and a luminance signal Y combined with a synchronizing signal S.

24. A method for recording an image signal onto a recording medium, said method comprising:

reading a first mode image signal which comprises said image signal processed in accordance with a first mode to have R-Y and B-Y differential color signals, a luminance signal Y combined with a synchronizing signal S, and K horizontal scanning lines per field; and recording a second mode image signal formed by processing said first mode image signal to have R-Y and B-Y differential color signals, a luminance signal Y combined with a synchronizing signal S, and L horizontal scanning lines per field, L being smaller than K, said recording comprising recording a part of said K horizontal scanning lines of said first mode image signal in a part of a vertical blanking period of said second mode image signal, whereby the number of horizontal scanning lines recorded on said recording medium is increased in comparison with a device in which said vertical blanking period is not used for recording said second mode image signal; and whereby each of said K horizontal scanning lines recorded in said part of a vertical blanking period comprises R-Y and B-Y differential color signals, and a luminance signal Y combined with a synchronizing signal S.

25. A device for processing an image signal of a first mode so as to generate an image signal of a second mode, said first mode image signal comprising K horizontal scanning lines per field, and said second mode image signal comprising L horizontal scanning lines per field, L being smaller than K, an integer M being equal to the integer component of K÷L, a number N being the remainder of K÷L, said image signal processing device comprising:

memory means for storing said first mode image signal;

means for writing said first mode image signal in said memory means at a timing corresponding to said first mode;

means for reading said first mode image signal from said memory means at a timing corresponding to said second mode; and means for controlling said reading means in such a manner that a reading operation is started during a blanking period of the second mode, whereby a part of N of said K horizontal scanning lines of said first mode image signal is recorded in a vertical blanking period of said second mode image signal.

* * * * *

UNITED STATES PATENT AND TRADEMARK OFFICE
CERTIFICATE OF CORRECTION

PATENT NO. : 5,546,192
DATED : August 13, 1996
INVENTOR(S) : K. SATO

It is certified that error appears in the above-indentified patent and that said Letters Patent is hereby corrected as shown below:

In the Drawing:

In Figure 4, insert ---YES--- to indicate that when step 110 is affirmed, processing proceeds to step 107, and insert ---NO--- to indicate that when step 110 is negated, processing ends.

In Figure 9, change the label of element 45 from "SPINDLE CONTROL" to ---SYNC. SEPARATING CIRCUIT---.

Signed and Sealed this

Sixteenth Day of September, 1997

Attest:

BRUCE LEHMAN

Attesting Officer     Commissioner of Patents and Trademarks